Aug. 5, 1930.  G. G. BUSH  1,772,203
CHUCK
Filed Feb. 17, 1926
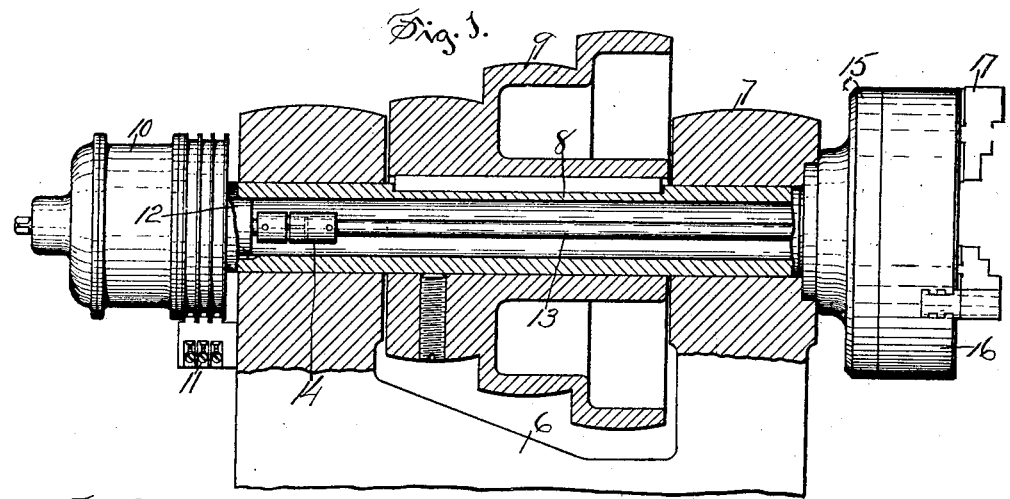
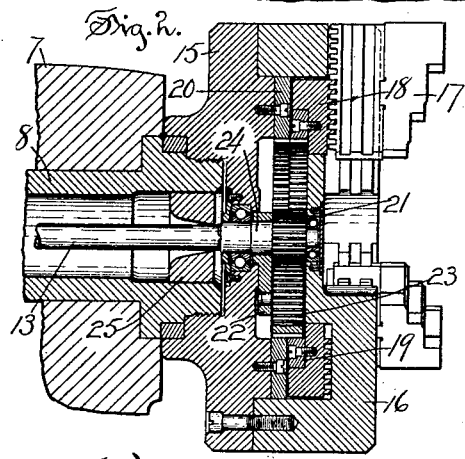
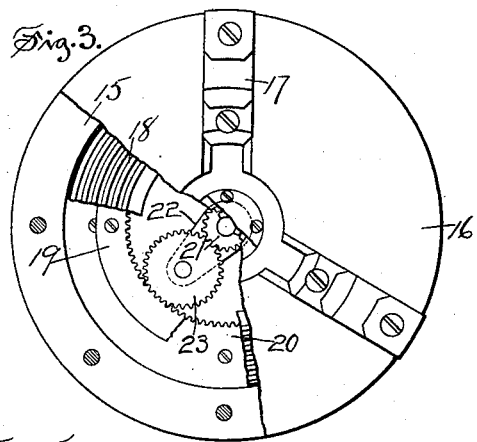
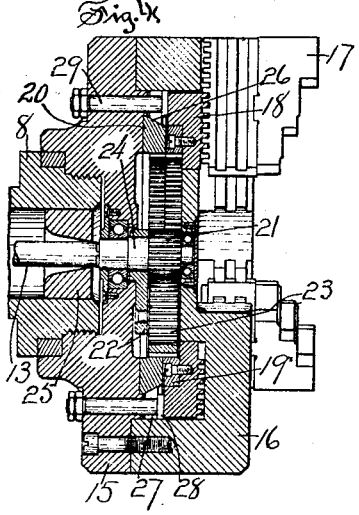
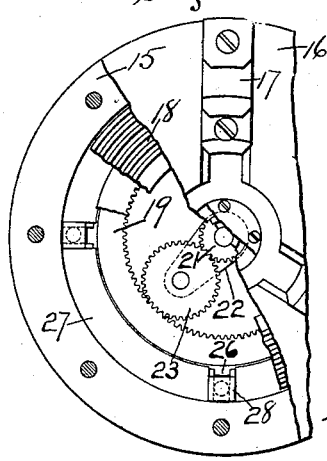
INVENTOR
George G. Bush
by
Arthur B. Jenkins
ATTORNEY Patented Aug. 5, 1930

1,772,203

UNITED STATES PATENT OFFICE

GEORGE G. BUSH, OF NEWINGTON, CONNECTICUT, ASSIGNOR TO UNION MANUFACTURING COMPANY, OF NEW BRITAIN, CONNECTICUT, A CORPORATION OF CONNECTICUT

CHUCK

Application filed February 17, 1926. Serial No. 88,936.

My invention relates more especially to that class of chucks comprising a rotatably mounted body having jaws that are movable radially thereon to clamp and hold pieces of work, and an object of my invention, among others, is the production of a chuck having mechanism by means of which the jaws may be readily operated in a particularly efficient manner.

One form of chuck embodying my invention and in the construction and use of which the objects herein set out, as well as others, may be attained, is illustrated in the accompanying drawings, in which—

Figure 1 is a view in side elevation of a portion of a head stock provided with my improved chuck, with parts broken away to show construction.

Figure 2 is a view of a portion of said stock and of my improved chuck cut in central lengthwise section.

Figure 3 is a face view of my improved chuck with the face plate partially broken away to show construction.

Figure 4 is a view similar to Figure 2, but showing a modified form of construction.

Figure 5 is a view similar to Figure 3, but showing the chuck as illustrated in Figure 4.

In the accompanying drawings the numeral 6 indicates a portion of the head stock of a lathe of any ordinary construction and mounted in any ordinary manner and comprising bearings 7 for a hollow chuck operating spindle 8 mounted in said bearings, and having means, as a stepped pulley 9, to which a belt may be applied, to provide rotation for the spindle. A motor 10, preferably eletcric, is secured to and supported by the spindle 8, at its back end, this motor being of any ordinary type provided with means as 11 for the attachment of wires to supply current to the motor for driving purposes. The motor will also be of the ordinary type whereby reverse movement may be obtained, and it will also be provided with means, as a rheostat for supplying current in variable amounts to vary the driving force that may be applied to the motor and it will also have an overload relay for the purpose of throwing a switch and stopping the motor when an overload thereon takes place, these parts last described not being shown for the reason that they are old and well known and will be understood by those skilled in the art.

A hub 12 from the motor projects into the rear end of the spindle 8 and is rigidly secured thereto, and a jaw operating spindle 13 is connected with the motor to be driven thereby as by means of a flexible joint 14 and extends through the spindle to the forward end thereof where it is connected with the jaw operating mechanism in a manner to be hereinafter described.

A back member 15 of the chuck is secured to the front end of the spindle 8 in any ordinary manner and a front member 16 of the chuck is secured to the member 15 likewise in any ordinary manner, which members constitute a body or shell. Chuck jaws 17 are mounted for radial movement on the member 16 as by means of a scroll 18 in a manner common to chucks of this class.

In adapting my invention to the structure a ring gear 19 is secured to the scroll 18 and a ring gear 20 is secured to the member 15 of the chuck body, each of these rings having teeth on their inner edges to mesh with a scroll operating pinion 23 mounted on an arm 22 pivoted on the hub 24 of a driving pinion 21 that is rotated by the spindle 13. The rings 19—20 have a different number of teeth, in the structure shown one ring having one tooth more than the other ring so that as they are engaged by the revolving pinion 23 the ring 19 will be moved relatively to the ring 20, thereby rotating the scroll 18 to impart radial movement to the chuck jaws 17, this movement, however, being very slow as compared with the rate of movement of the pinion 21. The driving pinion 21, as before stated, is driven by the spindle 13, the forward squared end of which fits a similarly shaped socket in the hub 24 of the pinion 21 to establish the driving connection.

A guide bushing 25 is inserted in the front end of the spindle 8 as a means for guiding the spindle 13 into engagement with the socket in said hub. In the operation of this device the spindle 8 being driven by the pulley 9 the chuck jaws 17 may be opened or closed to release or grasp a piece of work by operating the motor 10 in one or the other direction. When the motor is operated to close the jaws upon a piece of work, when such jaws have gripped the work sufficiently the overload on the motor thereafter caused will effect the operation of the overload relay to close the switch and stop the operation of the motor. It will be noted that the motor is continuously rotated with the spindle 8 and is, therefore, extremely effective for operation of the jaws to release or clamp a piece of work when the spindle is running.

The device shown in Figures 4 and 5 is very similar to that hereinbefore described, the principal exception being that the gear ring 20 has a beveled edge 26 that is engaged by sections of a clamping ring 27 having on their adjacent ends lips to receive the ends 28 of clamping bolts 29. By manipulating the nuts on the ends of these bolts, the amount of friction of the segments 27 on the ring 20 may be graduated to permit the ring to slip upon the application of a certain degree of force to the chuck jaws 17.

The purpose of this structure is that when the motor is operated to close the jaws 17 when a predetermined amount of pressure has been applied by the jaws upon the work, the gear ring 20 will slip and thereby stop the application of more pressure by said jaws. This slipping, however, will take place only for an instant as when the jaws have clamped the work the motor will be stopped by a manual operation of means for supplying the current to the motor. This latter structure will be found very effective in cases where a higher variation in the amount of power to be applied to the chuck jaws is required, and especially where a very slight grip is required by said jaws.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A chuck comprising jaws movably mounted on a body to hold or release a piece of work, a chuck operating spindle for rotating said chuck, a motor including a casing immovably secured to and mounted to rotate with said spindle, and a rotatable shaft connection between said chuck jaws and motor for operation of the former by rotation of said shaft by said motor.

2. A chuck comprising jaws movably mounted on a chuck body to hold or release a piece of work, a chuck operating spindle for rotating said chuck, a motor rigidly secured to and mounted to rotate with said spindle, a jaw operating spindle extending through said chuck operating spindle and connected with said motor to be rotated by said motor independently of said chuck operating spindle, and an operative connection between said jaw operating spindle and said jaws for operation of the latter by the former.

3. A chuck comprising a member with jaws movably mounted thereon, chuck jaw operating mechanism including two toothed members having a different number of teeth one from the other, a pivotally mounted arm, a pinion mounted on said arm and engaged with the teeth of both of said toothed members, a driving pinion operatively connected with the pinion first mentioned, and a driving shaft secured to said driving pinion and acting as a pivotal support for said arm.

4. A chuck comprising a body with jaws operatively mounted thereon, a chuck jaw operating mechanism including a scroll engaged with said chuck jaws, a toothed ring secured to said body, means for rotating said body, a toothed ring secured to said scroll, said rings having a different number of teeth one from the other, a revolubly mounted pinion engaged with the teeth of both of said rings, a spindle having a pinion engaged with the pinion first mentioned, and means for independently rotating said spindle.

5. A chuck comprising a body with jaws operatively mounted thereon, chuck jaw operating mechanism including a scroll engaged with said chuck jaws, a toothed ring secured to said scroll, a second toothed ring, said rings having a different number of teeth one from the other, a clamping ring engaging said second ring for connecting the latter to said body, means for adjustably pressing said clamping ring against the second ring, a pinion engaged with the teeth of both of said rings, and means for rotating said pinion.

6. A chuck comprising a body with jaws operatively mounted thereon, chuck jaw operating mechanism including a scroll engaged with said chuck jaws, a toothed ring secured to said scroll, a second toothed ring, said rings having a different number of teeth one from the other, a sectional clamping ring having a beveled surface engaging a beveled surface on said second ring, means for pressing the sections of said clamping ring into engagement with said second ring, a pinion engaging with the teeth of both of said rings, and means for rotating said pinion.

7. A chuck comprising a body with jaws operatively mounted thereon, a chuck operating spindle for rotating said body, two toothed members having a different number of teeth one from the other, a pivotally mounted pinion engaged with the teeth of both of said toothed members, a driving pinion operatively connected with the pinion first mentioned and having a shaft projecting centrally through said spindle, means for rotating said spindle, and means on the spindle for independently rotating said shaft.

8. A chuck comprising a body, movable jaws carried by the body, jaw operating mechanism including two toothed members having a different number of teeth one from the other, a power shaft extending into said body, rotatable means meshing with both of said toothed members, and means concentric with and connecting the first means to said shaft for rotating the first means on its own axis and around the axis of the shaft.

9. A chuck comprising a body, movable jaws carried by the body, jaw operating mechanism including two relatively movable members, a power shaft extending into said body at its center, rotatable means having its periphery operatively connected to said members to move them relative to each other when said means is rotated on its axis and moved bodily around the axis of said shaft, and means concentric with the shaft to connect the shaft and the first means for operating said first means.

10. A chuck comprising a spindle, a body rigidly mounted on one end of the spindle and having jaws adjustably mounted thereon, a motor mounted on the opposite end of the spindle, and rotatably mounted means operatively connecting the motor and the jaws and rotatable by said motor to adjust the jaws on said body.

11. A chuck comprising a spindle, a body rigidly mounted on one end of the spindle and having jaws adjustably mounted thereon, a motor mounted on the opposite end of the spindle, rotatably mounted means operatively connecting the motor and the jaws and rotatable by the motor to adjust the jaws on said body, and bearings supporting the spindle adjacent the body and the motor.

12. A chuck comprising a spindle, a body rigidly mounted on one end of the spindle and having jaws adjustably mounted thereon, a motor rigidly and concentrically mounted on the opposite end of the spindle, rotatably mounted means operatively connecting the motor and the jaws and rotatable by the motor to adjust the jaws on said body, and bearing means supporting the spindle adjacent the body and the motor.

13. A chuck comprising a spindle, a body rigidly mounted on one end of the spindle and having jaws adjustably mounted thereon, a rotatably mounted scroll to operate said jaws, a motor mounted on the opposite end of the spindle, means operatively connecting the motor and the scroll for rotation of the latter to adjust the jaws on said body, spaced bearings supporting the spindle adjacent the body and the motor, and driving means for the spindle located between the bearings.

14. A chuck comprising a spindle, a body rigidly mounted on one end of the spindle and having jaws adjustably mounted thereon, a rotatably mounted scroll to operate said jaws, a motor rigidly mounted on the opposite end of the spindle, and means extending from the motor axially through the spindle and into the interior of the body for operatively connecting the motor and the scroll for rotation of the latter to adjust the jaws on said body.

15. A chuck comprising a spindle, a body rigidly mounted on one end of the spindle and having jaws adjustably mounted thereon, a rotatably mounted scroll to operate said jaws, a motor rigidly and concentrically mounted on the opposite end of the spindle, and means extending from the motor axially through the spindle and into the interior of the body for operatively connecting the motor and the scroll for rotation of the latter to adjust the jaws on said body.

16. A chuck comprising a spindle, a body rigidly mounted on one end of the spindle and having jaws adjustably mounted thereon, a rotatably mounted scroll to operate said jaws, a motor rigidly mounted on the opposite end of the spindle, means extending from the motor axially through the spindle and into the interior of the body for operatively connecting the motor and the scroll for rotation of the latter to adjust the jaws on said body, and bearings supporting the spindle adjacent the body and the motor.

17. A chuck comprising a spindle, a body rigidly mounted on one end of the spindle and having jaws adjustably mounted thereon, a rotatably mounted scroll to operate said jaws, a motor mounted on the opposite end of the spindle, means operatively connecting the motor and the scroll to rotate the latter for adjusting the jaws on said body, and bearings supporting the spindle.

GEORGE G. BUSH.